May 26, 1931.  F. PALM  1,806,949
ARC WELDING CHILL
Filed Jan. 6, 1930
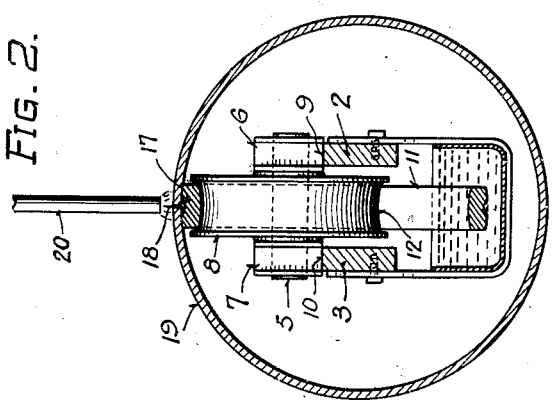
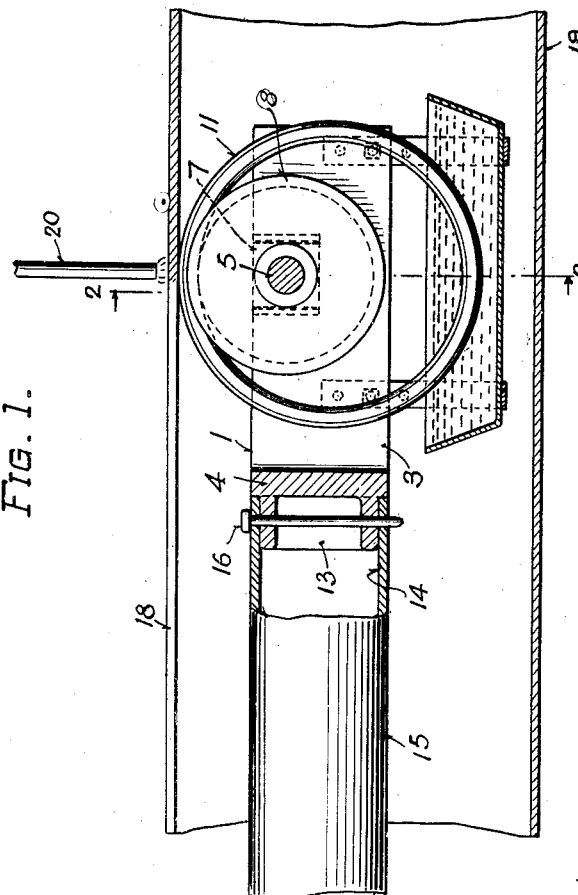
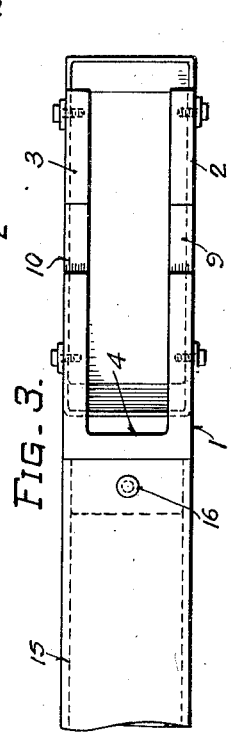
INVENTOR.
Frederick Palm
BY
ATTORNEY.

Patented May 26, 1931

1,806,949

UNITED STATES PATENT OFFICE

FREDERICK PALM, OF SHOREWOOD, WISCONSIN, ASSIGNOR TO A. O. SMITH CORPORATION, OF MILWAUKEE, WISCONSIN, A CORPORATION OF NEW YORK

ARC WELDING CHILL

Application filed January 6, 1930. Serial No. 418,951.

This invention relates to an arc welding chill.

An object of the invention is to provide a chill which can be quickly and easily adapted to pipe of different diameters.

Another object is to provide a chill having a large area of cooling surface.

A further object is to provide a chill which readily adjusts itself to the inner surface of the pipe.

The invention is best understood by reference to the accompanying drawings in which:

Figure 1 is a longitudinal section of the chill.

Fig. 2 is a view taken on the line 2—2 of Figure 1.

Fig. 3 is a top plan view of the mandrel with the bearings, roller and chill ring removed.

The chill has a forked frame 1 comprising two brackets 2 and 3 and a cross bar 4. A stub shaft 5 is journaled in a pair of detachable bearings 6 and 7 and supports a roller 8 between the brackets 2 and 3. The bearings 6 and 7 engage in notches 9 and 10 in the brackets 2 and 3 to make them easily detachable. Movement out of the notches 9 and 10 is restricted by downward pressure which is exerted against the bearings during the welding operation.

The chill ring 11 is of greater diameter than the roller 8, and is rotatably supported by the roller between the brackets 2 and 3. The roller 8 is preferably provided with an annular groove 12 to conform to the inner periphery of the chill ring 11 and to guide the chill ring as it travels along the seam.

The chill frame 1 has a short extension 13 which is integral with the cross bar 4 and which engages in the socket 14 in the end of the mandrel 15. The extension 13 is held in place by a pin 16.

Each chill is equipped with an assortment of chill rings each of which is adapted to a certain type of work. Some chill rings, such as ring 11, have an annular groove 17. A ring may be replaced in a few seconds without tools by lifting the bearings 6 and 7 from the notches 9 and 10 in the brackets 2 and 3.

During the welding operation the chill is placed directly beneath the seam 18 to be welded in the pipe 19. One terminal of a source of electric power is connected to the pipe 19 and the other to a fusible metallic weldrod 20. The weldrod is touched to the metal of the seam directly above the chill and is quickly withdrawn to strike the arc. As the weldrod is passed along the seam, the heat of the arc melts the weldrod and the edges of the plates to be welded. The chill is held directly beneath the arc or at any required position relative thereto as the weldrod passes along the seam. The chill serves as a backing member and prevents the fused metal from falling away from the seam and causes the metal to rapidly solidify and to unite the plates into an integral structure.

I claim:

1. An arc welding chill comprising a chill ring, means for rotatably supporting said ring, and means for moving said ring along the seam to be welded.

2. An arc welding chill comprising a chill ring, a roller within said ring and eccentric thereto for rotatably supporting the same, and means for guiding said ring along the seam to be welded.

3. An arc welding chill comprising a chill ring, a grooved roller within said ring for rotatably supporting and guiding the same, and means for moving said chill ring relative to the seam.

4. An arc welding chill comprising a metal ring, a grooved roller arranged eccentric thereto for supporting and guiding the same, a support detachably holding said grooved roller, and means for moving said roller relatively to the seam to be welded.

5. An arc welding chill comprising a mandrel adapted to be positioned beneath the seam being welded, a horizontal transverse roller removably supported by said mandrel, and a chill ring rotatably supported by said roller and eccentric thereto, said chill ring being adapted to progressively engage the metal of the seam being welded during the welding operation.

In testimony whereof I have signed my name at Milwaukee, Wisconsin, this 2nd day of January, 1930.

FREDERICK PALM.